May 29, 1923.
J. R. ALEXANDER
1,457,204
SYSTEM FOR DISTRIBUTING PACKAGES
Filed Aug. 31, 1920
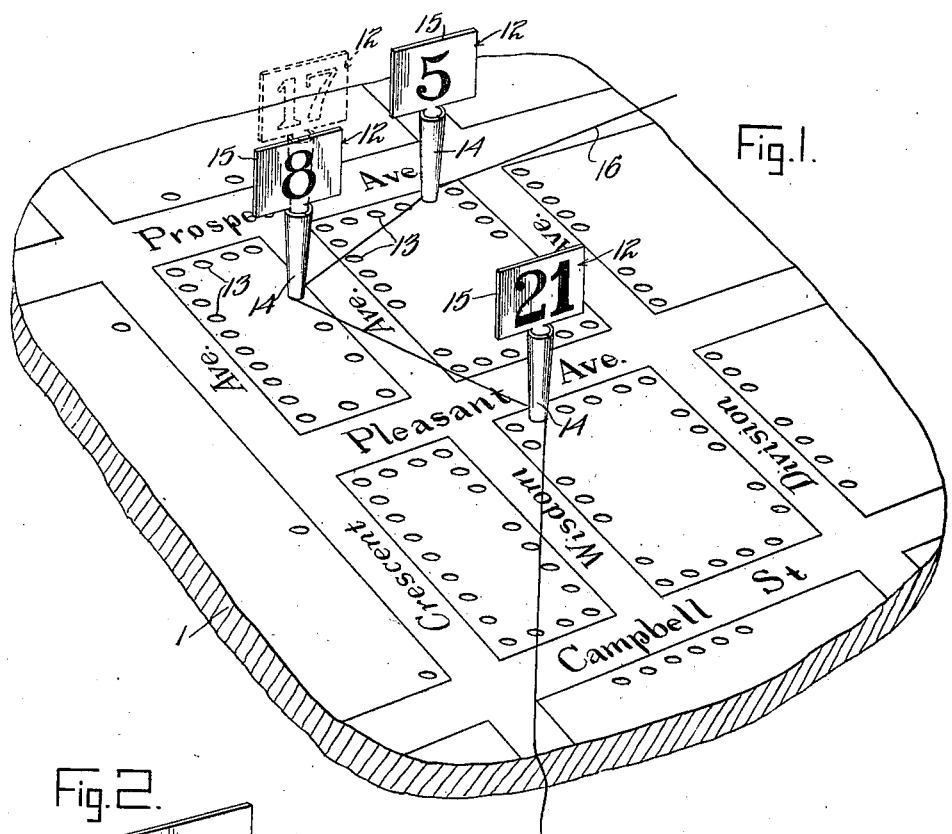
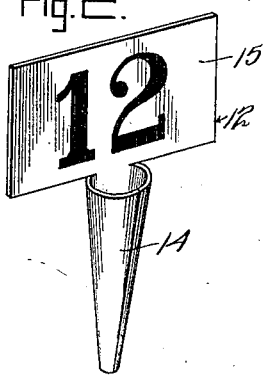
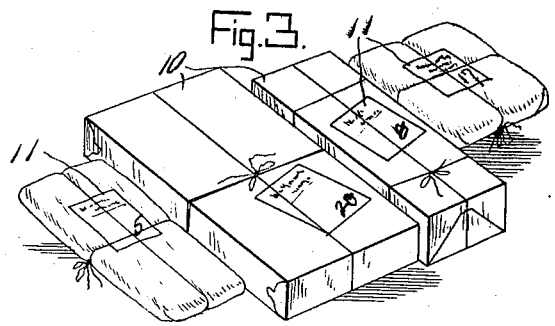
Inventor
John R. Alexander
By *(signature)*
Attorney Patented May 29, 1923.

1,457,204

UNITED STATES PATENT OFFICE.

JOHN R. ALEXANDER, OF MEMPHIS, TENNESSEE.

SYSTEM FOR DISTRIBUTING PACKAGES.

Application filed August 31, 1920. Serial No. 407,154.

*To all whom it may concern:*

Be it known that I, JOHN R. ALEXANDER, a citizen of the United States, residing at Memphis, in the county of Shelby and State of Tennessee, have invented certain new and useful Improvements in Systems for Distributing Packages, of which the following is a specification.

My said invention consists of a method for making and assembling articles, such as packages, and means whereby it may be carried out.

The object of this invention is to facilitate the distribution of small articles to various destinations, and particularly to facilitate delivery of packages of merchandise, whereby the packages to be delivered along the same route may be readily grouped for loading into a delivery wagon. Delivery of such commodities must extend over wide areas, but should be swift and certain to avoid vexatious delays, while the system of distribution to the transporting agencies should be as simple as possible in order that such distribution may be made quickly by unskilled labor, yet without needless risk of errors, all as will be hereinafter more fully described and claimed.

Referring to the accompanying drawing which is made a part hereof and on which similar reference characters indicate similar parts, Figure 1, is a perspective of a portion of a map of a city, showing certain indicators in position, Figure 2, a detail of an indicator, and Figure 3 a detail showing a few packages marked for delivery.

The map or chart 1 may consist of a block of wood or other material on which lines are drawn to represent a portion of the surface of the earth. In Figure 1 these lines represent a section of a city, but they might be drawn within the scope of the invention to represent the floors and corridors of an apartment house, the lines of a railway system or any system of communication by means of which articles to be distributed can reach their destination.

In places appropriate to indicate such destinations, as in the present instance within the lines representing a city block, holes are bored or otherwise provided, as at 13, such holes being here spaced to indicate the different dwellings in each block. Such holes will be variously spaced and located according to whether they are to indicate residences along a road or street, apartments in a building, stations on a railway, etc.

For insertion in the holes 13, there are provided indicators or markers 12, each consisting of a support 14, and an upper flat portion 15, and bearing a mark or indicator such as numeral, as here illustrated Arabic or Latin numerals, letters, colored parts, or other arbitrary or conventional signs may be used, but preferably they will be such as form some sequence which is in common use. The indicators may be made from sheet metal, as shown, the upper portion being left flat and the lower portion cut to a tapered form and partially severed from the upper, and then bent into a hollow conical shape. By this structure one indicator may be inserted into another already on the map thereby indicating that more than one parcel is to be delivered at one place.

The packages, 10, 11 or other objects to be distributed will be taken to the map and marked with numerals or other devices corresponding to those on the indicators. As each is marked an indicator with the same mark is placed in a hole on the map. The packages may then be grouped as by placing them in compartments intended to receive packages bearing numbers of a certain series, and when all the parcels sold in a day, for example, have been charted, those to be delivered by a specified delivery wagon, or by a certain railroad, or to a certain station on the road, may readily be assembled by unskilled laborers having no special knowledge of the geography of the area involved. It is desirable to trace on the map either by pencil marks or by the use of a length of cord 16 or otherwise a route to be followed in making deliveries. For example, in Figure 1 such a route should start from the store or warehouse (not shown), proceed to indicator 21, then to 8 then to 5 and so on. If this is laid out by a practiced hand it can be made so as to cover the maximum number of deliveries with a minimum of travel. After the route is laid out the parcels may be arranged in hampers or a wagon body or the like in the reverse order to the direction of travel so as to bring to the front or top the first to be delivered and so on. In fact, the greater part of the work may be done by very illiterate persons if they can only recognize the indicia used, or by foreigners having no knowledge of the language.

Various modifications of my device will suggest themselves to those skilled in the art, as the indicators may assume various forms and the indicia on them may vary. The system may also be changed to meet the requirements of the particular business, and may well be used in the distribution of letter and other mail, baskets, hampers and any other transportable container or article, whether the center from which distribution takes places be a store, warehouse, dock, ship or other repository of merchandise or the like. The system applies also to collection of objects or devices which is the converse of distribution, and such collection may be of parcels, freight, mail, etc. The system or parts or variants thereof may also be used to indicate the location of trucks or other vehicles, messengers, traveling salesmen, etc., all as will be obvious, and many other uses will suggest themselves in considering the same. I do not therefore limit myself to what is herein shown and described but only to what is set forth in the appended claims.

Having thus fully described my said invention, what I claim as new and desire to secure by Letters Patent is:

1. In a system of distribution, the combination of a map having means thereon so located as to indicate possible destinations, means adapted for attachment to the map and markings on said latter means adapted to be readily duplicated on the objects to be delivered, said attachable means being adapted to be superposed on each other to indicate a like destination for a plurality of objects.

2. In a system of distribution for objects, such as parcels, a member having a surface in the form of a map and having perforations therein located to indicate possible destination of objects, two corresponding sets of markers, individual markers of each set bearing similar indicators, the markers of one set being adapted to be attached to objects to be distributed and the corresponding markers of the other set adapted to be affixed to the map in positions indicating the destination of an object bearing a similar indicator.

3. An indicator formed of a strip of sheet metal having its lower edges cut away and the remaining portion bent to form a tubular standard, substantially as set forth.

4. A sheet metal indicator comprising a flat upper portion and a tubular supporting portion, substantially as set forth.

5. An indicator formed of a strip of sheet metal, having its lower part cut away and bent to a tapered form with meeting edges and its upper part consisting of a flat, rectangular portion, adapted to carry a mark on its face.

6. An indicator consisting of a flat upper portion adapted to carry a mark and a hollow lower portion tapered inside and out, whereby one indicator may be inserted in another.

In witness whereof, I have hereunto set my hand and seal at Memphis, Tennessee, this 21 day of August, A. D. nineteen hundred and twenty.

JOHN R. ALEXANDER. [L. S.]

Witnesses:
    JOHN W. FARLEY,
    J. M. SAUNDERS.